April 8, 1952 G. T. KODAMA 2,591,705

VARIABLE CAPACITOR

Filed Jan. 18, 1949 2 SHEETS—SHEET 1

INVENTOR.
GEORGE T. KODAMA
BY
Arthur G. Connolly
his ATTORNEY

INVENTOR.
GEORGE T. KODAMA
BY Arthur G. Connolly
ATTORNEY

Patented Apr. 8, 1952

2,591,705

UNITED STATES PATENT OFFICE 2,591,705

VARIABLE CAPACITOR

George T. Kodama, Milwaukee, Wis., assignor to Herlec Corporation, Milwaukee, Wis., a corporation of Wisconsin Application January 18, 1949, Serial No. 71,454

10 Claims. (Cl. 175—41.5)

This invention relates to improvements in a voltage divider unit for electronic circuits, and particularly to a compensated volume control unit for radiant energy receiving circuits, and to electronic circuits especially adapted to utilize such voltage dividing volume control.

Volume control in a radio receiver, reduces audibility of both high and low frequency notes or tones. However, the human ear is not responsive to low frequency tones to the same degree as to high frequency tones. Hence, the better radio receivers have tone controls to compensate for the difference in aural sensitivity, by reducing the high frequency tones to a greater degree than the low frequency tones. But such tone compensators are too bulky and costly for many varieties of radio receivers now on the market.

The voltage dividers now used in radio circuits for tone control comprise a plurality of capacitors and resistors, of which at least one resistor must be variable. It is now usual to employ three capacitors, one fixed resistor, and one variable resistor which may have more than one movable contact and which has an intermediate tap, and hence provides at least one variable and one fixed resistance portion. Heretofore, the capacitors and resistors were made as separate components to which separate connections had to be made during assembly in a circuit such as a radio receiving circuit. The use of the large number of separate components heretofore required, entailed the problems of providing space and mounting means for the several components in the assembled device, increased the possibility of making errors in connections, and required considerable assembling time.

If the voltage dividing tone control above briefly described, is replaced by a variable capacitor unit as herein disclosed, it is possible to obtain the desired results with considerably simplified circuits. Such circuits require only a source of higher potential, a conductor at a minimum potential and means producing a potential intermediate the higher and the minimum potentials. The potential is divisible between the several capacitors of my unit, to any degree desired and at any rate desired.

It is, therefore, one object of the present invention to provide a tone compensated volume control device for electronic circuits in which all of the required components are combined in a single unit of relatively small size and low cost.

Another object of the invention is to provide a voltage dividing capacitance unit for use as a volume control in radiant energy receiving and translating devices.

Another object of the invention is to provide a tone control device for electronic circuits in which a number of fixed capacitors and a number of fixed and variable resistors are replaced by a unit including only a plurality of variable capacitors so related that one or more of the capacitors will be in circuit as required by the circuit conditions.

Another object of the invention is to provide a capacitor type volume control device for radio receiving circuits, in which the capacity may be varied from a maximum to a minimum either at a continuously varying rate or at a differently varying rate as desired and to any degree desired to vary the volume of the sounds produced by the radio.

A further object of the invention is to provide simplified electrical radiant energy receiving circuits in which the electric signal frequencies supplied to an output circuit may be easily varied to vary the tone produced.

Another object of the invention is to provide simplified radio receiving circuits employing a multiple variable capacitor of the voltage dividing type as a tone control device compensating for differences in audibility of the produced sounds of difference frequencies.

Another object of the invention is to provide a radio circuit in which a single capacitor type unit is utilized for so dividing the voltage applied to the output circuit of the radio receiver as to obtain any desired variation in the frequency of the several ranges of notes produced by the receiver.

Objects and advantages other than those above set forth will be apparent from the following description of my invention.

Generally, the present invention is embodied in a radio receiver volume control device comprising a stator and a rotor collectively forming a plurality of variable capacitors of which one or more capacitors may be wholly or partially placed in circuit by a single movement. The stator includes an insulating member having an aperture therethrough for receiving a bushing by which the entire structure may be mounted on a base, and a contact ring mounted on the insulating member to provide one terminal for the capacitors, the other terminals being provided by lugs severally connected with the various capacitor plates. The rotor includes a shaft movable in the stator bushing for carrying an insulating member on which is fixed resilient contact means movably engaging with the stator contact ring and resiliently engaging a movable or rotor capacitor plate sub-assembly.

In one modification of the volume control, an annular dielectric extends about the aperture through the stator insulating member and is held stationary thereon. The stationary dielectric bears a plurality of conductive coatings incapable of self-support, for co-action with the rotor plate sub-assembly which comprises a single capacitor plate resiliently supported by the rotor contact means for rotation in contact with the stationary plate sub-assembly. In the rotor sub-assembly, the capacitor plate is a flexible metallic foil and is resiliently supported on a pad backed by a rigid plate conductively connected with the capacitor plate and with the contact means. The movable plate, therefore, conforms to the surface of the stator plates under the pressing action of the pad and of the resilient contact means to provide the maximum capacitance for the several capacitors formed by the movable plate in co-action with the stationary plates.

In the second embodiment of the volume control, a plurality of capacitor plates are fixed on and supported by the stator insulating member for co-action with a rotor plate sub-assembly. The movable plate sub-assembly includes a rigid backing plate, a capacitor plate and a dielectric. In the present instance either or both the stator and the rotor capacitor plates may be conductive coatings incapable of self-support or may be metallic foils. The stator plates may be resiliently supported, if desired, for co-action with the rotor contact means in resiliently pressing the dielectric into close contact with the stationary plates.

The stator and the rotor of both modifications, except for portions of the bushing, the shaft and the various terminals, are preferably enclosed in a casing or cover both to avoid damage to the various parts, and interference with other circuit elements due to the operation of the voltage divider.

A plurality of embodiments of my invention are illustrated in the accompanying drawings in which.

Figure 1:
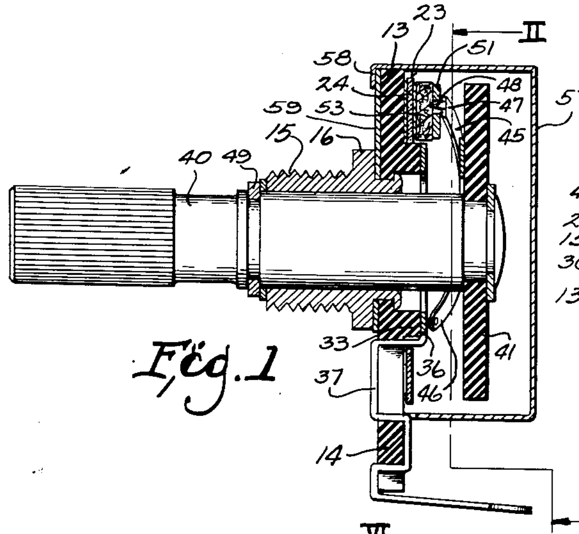
Fig. 1 is a sectional view on substantially a central axial plane of one embodiment of the volume control.
Figure 2:
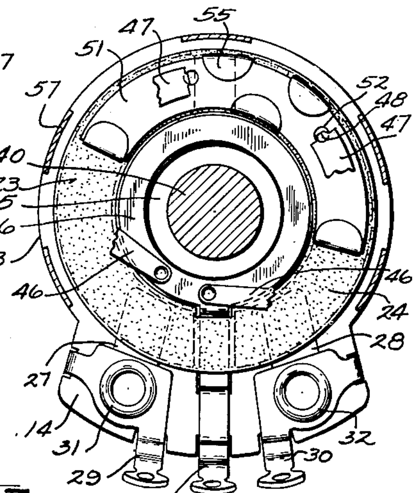
Fig. 2 is a transverse section on the plane of line II—II of Fig. 1.

Referring particularly to the drawings, a substantially circular member 13 of insulating material with a portion 14 extending from one edge thereof, has a central aperture therethrough, partially defined by a flange extending from one side of the member. The aperture receives a bushing 15 with a flange 16 to engage one side of the insulating member 13 when the bushing end within the plate aperture engages a shoulder in the aperture. The bushing is externally threaded to receive a nut (not shown) by which the entire structure may be mounted on a base (also not shown).

A capacitor element generally designated 23 (see Fig. 4) is mounted on one side of the insulating member 13 and comprises an annular dielectric 24 preferably of high dielectric constant ceramic material with conductive coatings 25, 26 on one side thereof, which coatings are in the form of segments of an annulus and with the ends spaced from one another. The coatings are metallic and are formed on and bonded with the dielectric by one of the methods now known to form capacitor plates in combination with other portions of the structure. The plates 25, 26 are severally connected with conductive strips 27, 28 formed on the insulating member 13 and extending about apertures in the insulating member portion 14 for conductive connection with terminals 29, 30 fixed to such portion 14 by eyelets 31, 32. The dielectric 24 is positioned about the central aperture in member 13, by the flange 33 defining a portion of such aperture.

A conductive contact ring 36 is mounted on the flange 33 of insulating member 13 concentrically with the bushing 15 and has a radial extension 37 interlocked with such member to hold the ring in position in space relative to the capacitor element 23, the ring and its extension 37 forming a terminal for a capacitor element to be described.

Figure 6:
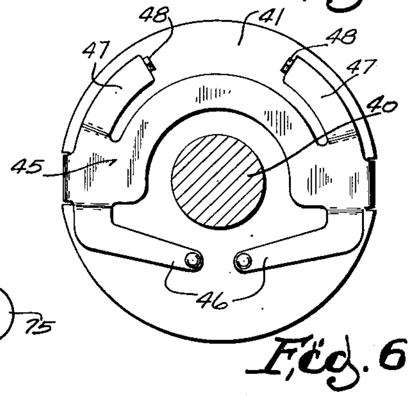
Fig. 6 is a transverse sectional view on the plane of line VI—VI of Fig. 3.

The rotor member comprises a shaft 40 mounted in bushing 15 and having a split and splined end as is usual for receiving an operating knob (not shown). The other end of the shaft 40 has fixed thereon a disc 41 of insulating material substantially co-extensive in size with the capacitor element 23. A contact member generally designated 45 (see Fig. 6) is fixed on the rotor disk 41 and is formed with a pair of resilient contact fingers 46 slidable on the contact ring 36 and with a pair of resilient fingers 47 with prongs 48 at the ends thereof for a purpose to be described. The contact fingers urge the shaft 40 in one axial direction but such movement of the shaft is prevented by a snap ring 49 acting between the bushing and a groove in the shaft.

Figures 3, 5:
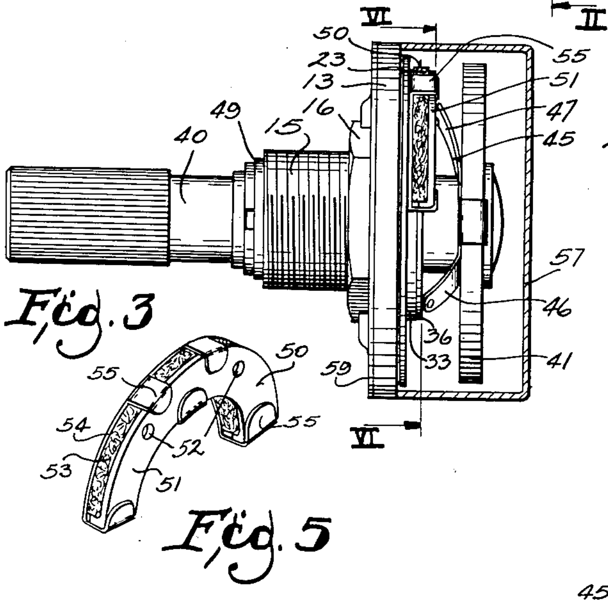
Fig. 3 is an elevation of the first embodiment of the volume control, with the cover cut away and with the rotor sub-assembly turned to obtain an elevational view thereof.
Fig. 5 is a perspective view of the rotor plate and the mounting therefor in the first embodiment of my volume control.

The prongs 48 of contact fingers 47 engage in a capacitor rotor sub-assembly generally designated 50 and comprising (see Fig. 5) a rigid metallic member 51 in the form of a segment of an annulus, having a width and a finished length substantially the width and length of either one of the conductive coatings 25, 26. The ends of the member 51 are bent in the same direction and the member is provided with holes 52 therethrough, equally spaced from the ends and from one another for a purpose appearing below. The member 51 serves as a backing plate for a similarly shaped and dimensioned pad 53 of a resilient material such as felt, rubber, etc., of considerable thickness. The pad supports a flexible metallic foil 54 also of the general shape and size of the backing plate 51 and the pad 53. The metal foil is attached to the backing plate by tabs 55 as shown to join the rotor sub-assembly parts and to provide conduction between plate 51 and foil 54.

The contact member prong fingers 48 pass through the backing plate holes 52 to engage in the pad and wedge in the holes so that the rotor sub-assembly is movable by movement of shaft 40 and the resilience of such fingers plus the resilience of pad 53 presses the foil 54 closely into contact with the dielectric 24 for cooperation with the stator plates 25, 26. The spacing of holes 52 secures a uniform distribution of pressure on backing plate 51 and through pad 53, on metal foil 54. Contact means 47 provide a conductive connection between rotor sub-assembly 50 and stator ring 36.

The pad is impregnated with a suitable moisture repellent such as one of the known liquid silicone compounds. The impregnating compound should be non-vaporizable under the conditions of use of the radio receiver and should have good insulating properties. The compound should also be inert to the various materials used in the unit and to atmosphere. Such compound may also serve as a lubricant between the dielectric 24 and rotor plate 54 to minimize wear.

It will thus be seen that coatings 25 or 26 and foil 54 severally form capacitors and that either or both of the capacitors so formed, will be in circuit dependent on the position of plate 54 relative to plates 25, 26. It will be understood that more than two fixed plates may be provided so that other capacitor combinations may be had for use in circuits requiring a multiplicity of such combinations.

The structure above described is preferably inclosed in a casing or cover 57 having ears 58 which may be bent over and interlocked with a metallic plate 59 held between insulator 13 and bushing flange 16. The inclosed parts are thus protected from damage and shielded against interference because plate 59 conductively connects cover 57 with bushing 15 which is usually grounded.

Figure 7:
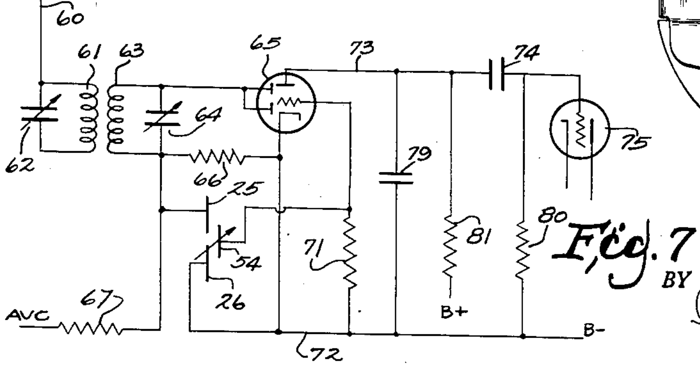
Fig. 7 is a fragmentary diagram of a first radio receiving circuit showing the connection therein of the present volume control.

The diagram shown in Fig. 7 illustrates the manner of connection of the present unit in a first radio receiving circuit requiring an alternating current voltage divider. The electrically active portions of the present voltage divider are designated by the numerals heretofore used for such portions. One side 60 of an alternating current supply line is connected with the primary winding 61 of a transformer bridged by a variable capacitor 62, the transformer secondary winding 63 being also bridged by a variable capacitor 64. One terminal of winding 63 is connected with the diodes of a diode triode electron discharge tube 65 while the other terminal of such winding is connected with the cathode of tube 65 through resistor 66 to complete the secondary circuit, resistor 66 imposing an electrical load between the transformer secondary and a B− conductor.

Figure 4:
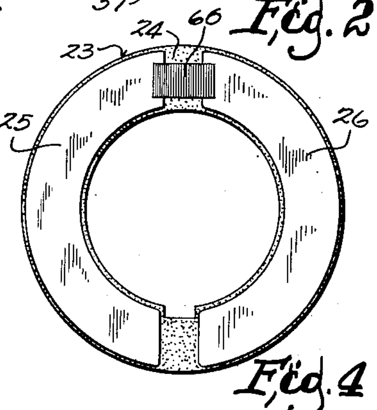
Fig. 4 is a plan view of one stator element of the first embodiment.

The resistor 66 may be either a separate element or may be combined with the present volume control. When so combined, the resistor is preferably a coating formed on stator dielectric 24 as shown in Fig. 4, the manner of forming such coatings being well known.

Capacitor plate 25 and resistor 67 are connected to the high voltage end of resistor 66 to receive the voltage developed across such resistor, and are connected through resistor 67 with the usual automatic volume control means, indicated as AVC. Capacitor plate 26 is connected with the B− or grounded conductor of the circuit so that any voltage from a maximum to ground potential, may be obtained by positioning plate 54 relative to plates 25 and 26 as will be described. The grid of tube 65 is connected with capacitor plate 54 which is also connected through resistor 71 to the B− conductor 72. The plate of tube 65 is connected through a conductor 73 and a capacitor 74 with the grid of the next amplification tube in the circuit, shown as a triode 75. A capacitor 79 and a resistor 80 are severally connected from the B+ conductor 73 and the grid of tube 75 respectively to the B− conductor 72, and a B+ voltage is supplied to conductor 73 through resistor 81. The functioning of the usual portions of the above circuit in a radio receiver, are well understood and do not require explanation.

The functioning of the present voltage divider in tone control depends on the positioning of plate 54 relative to plates 25 and 26. It will be seen that plate 25 is connected to a point of relatively high potential at the input end of the receiver, that plate 26 is connected to a point of relatively low potential or to ground and that plate 54 is connected to a point intermediate the input and the ground potentials. When plates 25 and 54 are superposed (first end position), maximum capacity is obtained between such plates and when plates 26 and 54 are superposed (second end position), a maximum input to output voltage ratio is obtained between such plates. As plate 54 is moved from the first end position to overlap both plates 25 and 26, the potential on plate 54 is divided between plates 25 and 26 in a ratio dependent on the degree of overlapping of the plates and the capacitive effect thereof can be made directly proportional to such overlapping or otherwise proportional as desired. Hence, automatic tone compensation is obtained because more of the energy going into the production of high frequency sounds is passed to ground to reduce audibility of such sounds while the low frequency energy is not by-passed to the same degree so that the audibility of the low frequency sounds is increased. It will thus be seen that the present invention provides tone compensating means so simple, small and inexpensive as to be applicable to radio receivers of even the lowest price now on the market.

In the second embodiment of my volume control with tone compensation, like parts are indicated by the same reference numerals as employed in describing the first embodiment. Stationary capacitor plates 87 and 88 shaped as segments of an annulus are formed on or placed on the insulating member 13. However, if such plates are of self-supporting material, terminals 29 and 30 are integral with the body of the plates and are fixed to the insulating member by eyelets 31 and 32 thus holding the plates in fixed position.

The movable or rotor plate sub-assembly in the present embodiment comprises a backing plate 89, a conductive plate 90 and a dielectric 91 mounted on the conductive plate and on the backing plate for movement therewith over the stationary capacitor plates 87, 88. The rotor plate 89 is fixed to rotor plate 90, 91 as by soldering or by the use of a conductive cement. It will be seen that the rotor sub-assembly is approximately one-half an annulus so that approximately one-half of the stationary plates can be simultaneously overlapped by the conductive rotor plate. In the present rotor sub-assembly the conductive plate may be either a separate member or formed on and bonded to the dielectric which is preferably a ceramic as above described. Resilient contact means 45 again engage with the backing plate 89 and with movable capacitor plate 90 unless the backing plate is also of conductive material.

Either of the above embodiments of the present voltage dividing volume control can be utilized in any one of the radio circuits herein shown, in which like parts are also designated by the same reference numerals.

Figures 8, 9, 10, 11, 12:
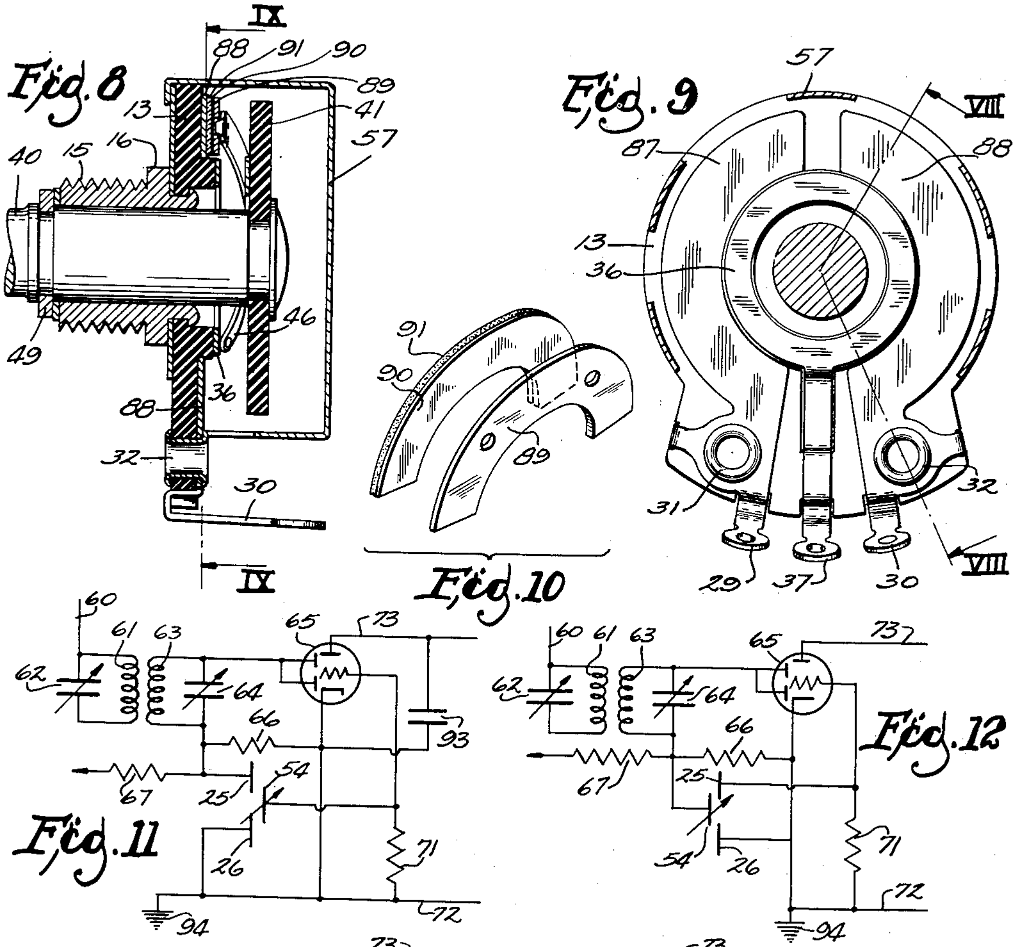
Fig. 8 is a sectional view on substantially a central axial plane of a second embodiment of the present volume control.
Fig. 9 is a transverse section on the plane of line IX—IX of Fig. 8.
Fig. 10 is an "exploded" perspective view of the rotor assembly of the second embodiment of my volume control.
Fig. 11 is a fragmentary diagram of a second radio receiving circuit showing the connection therein of the present volume control.
Fig. 12 is a diagram of a circuit similar to that shown in Fig. 11 but with the volume control reversely connected.

The circuit of Fig. 11 is similar to that shown in Fig. 7 excepting that the load resistor 66 is also connected through a fixed capacitor 93 with conductor 73 and conductor 72 is grounded as indicated at 94. The circuit of Fig. 12 is also similar to that of Fig. 7 and shows that the present control may be reversely connected in a circuit to provide an effect oposite to that above described.

Figure 13:
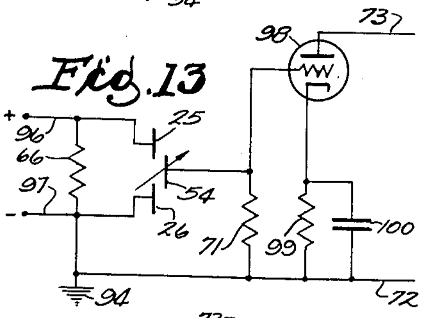
Fig. 13 is a fragmentary diagram of a third circuit.
Figure 14:
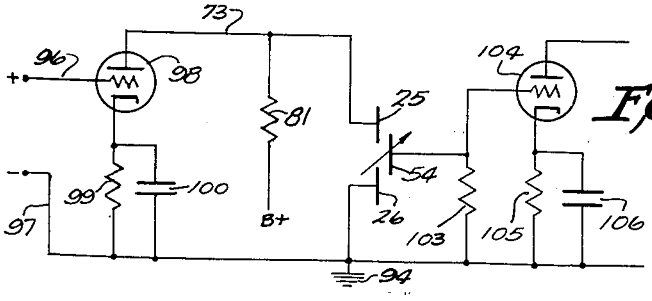
Fig. 14 is a fragmentary diagram of a fourth circuit.

In the circuit shown in Fig. 13, plate 25 is connected with one side 96 of an input circuit which is bridged by a load resistor 66 and plate 26 is at a lower potential obtained by connection thereof with the input circuit side 97. The cathode of triode amplification tube 98 is connected by a bias-supplying resistor 99 and a by-pass capacitor 100 with conductor 97. Plate 54 and the grid of triode 98 are connected through grid resistor 71 with conductor 97. Hence, plates 25, 26 and 54 are respectively at high, low, and intermediate signal potentials. In Fig. 14, plate 25 is connected with the anode of tube 98 and plate 26 is connected to grounded conductor 97. Plate 54 is connected with resistor 103 to the grid of a second triode amplification tube 104 having its cathode connected by a bias-supplying resistor 105 and bypass capacitor 106 with conductor 97. Hence, the plates 25, 26 and 54 are again respectively at high, low and intermediate potential.

Figure 15:
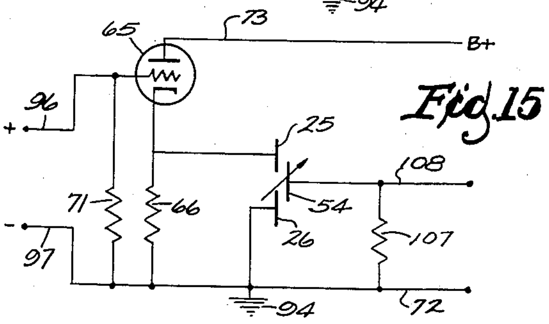
Fig. 15 is a fragmentary diagram of a fifth circuit for use with my volume control.

In the circuit shown in Fig. 15, plate 25 is connected to the cathode of tube 65 which returns to grounded line conductor 97 through load resistor 66, and plate 26 is connected directly with conductor 97. Plate 54 is connected with a resistor 107 which is connected between conductor 72 and conductor 108. The potential relations of the plates 25, 26, 54 are then again high, low and intermediate.

It will thus be seen that each of the above circuits provides for controlling the audio-frequency voltage, the plate 25 being connected to a source of high potential and plate 26 being connected to a point of low potential in the circuit while plate 54 is connected to a potential at a value intermediate the high and low potential values. The capacitance between plates 25 and 54 when in the first end position, is thus a minimum input to output voltage ratio (1:1) and between plates 26 and 54 when in the second end position, is at maximum input to output voltage ratio (1:0.0001). But as the plate 54 approaches the second end position a larger and larger portion of the high frequency signals are bypassed to ground and are thus reduced to provide a lesser high frequency voltage and proportionally more of the low audio frequency voltage in the output circuit. It will be understood that shifting the voltage divider from the first end position to the second end position progressively reduces the volume of the sounds produced by the receiver. Such reduction is dependent on the capacitances obtained between the two end positions and may be varied as desired.

As many apparently widely different embodiments of the invention may be made without departing from the spirit and scope hereof, it is to be understood that the invention is not limited to its specific embodiments except as defined in the appended claims.

I claim:

1. In a capacitor assembly for changing the output intensity and compensating tone frequencies in radio receivers, a stator comprising an insulating member having an aperture therethrough, a contact ring mounted on the insulation member and concentrically with the aperture therethrough, and a capacitor element held on the stator insulating member and including a dielectric, spaced conductive coatings supported by the dielectric on one side thereof, terminals mounted on the stator insulating member and separately connected with the conductive coatings on the dielectric and with the contact ring, a rotor comprising a shaft rotatably mounted in the stator insulating member, an insulating member mounted on the shaft, a conductive rotor plate adapted for conformation with and movement in contact with the other side of the stator dielectric, and resilient conductive means mounted on the rotor insulating member, the resilient conductive means having one pair of resilient contact fingers in slidable engagement with the stator contact ring and another pair of resilient fingers engaging and pressing the rotor plate against the stator dielectric and electrically connecting the rotor plate to the contact ring.

2. In a variable capacitor structure, a capacitor dielectric, a stationary conductive plate on one side of the dielectric, a rotor comprising a metal backing plate, a movable conductive plate supported on the backing plate, and resilient elements hooked into the backing plate for fixing and rotating the movable plate with respect to the stationary plate and pressing the movable conductive plate against the opposite side of the dielectric.

3. In a capacitor assembly, two fixed conductive plates supported in spaced relation with respect to each other, a member including a movable conductive plate and having a metal backing with holes therein, said member being movably held for positioning of the movable plate opposite to and in inverse capacitive relation with selectable portions of both of said fixed plates, a set of fixed terminals, each conductively connected to a different plate for fixedly receiving and stationarily holding an electrical lead to the corresponding plate, the electrical connection between the movable plate and its fixed terminal being completed through fixed contact elements and movable contact elements slidably engaging the fixed contact elements, the slidable contact elements having prong-like extensions mechanically engaging the holes in the metal backing, and manipulatable control structure connected to the movable member for adjusting the position of the movable plate.

4. A movable capacitor electrode unit comprising an arcuate metal backing plate having spaced perforations for receiving driving prongs, an arcuate yieldable conductive electrode plate, an arcuate resilient pad sandwiched between the two plates, said components being secured together to provide an arcuate assembly.

5. A movable capacitor electrode unit comprising an arcuate metal backing plate having spaced perforations for receiving driving prongs, an arcuate conductive plate fixed to and superimposed over the backing plate and an arcuate dielectric sheet mounted on and superimposed over the conductive plate.

6. In a capacitor assembly, two fixed conductive plates supported in spaced relation with respect to each other, an electrically resistive coating directly connecting said two plates, a movable conductive plate movably held for positioning opposite to and in inverse capacitive relation with selectable portions of both of said fixed plates, a high dielectric constant ceramic dielectric positioned to increase the capacitance resulting from said relation, and a set of fixed terminals each conductively connected to a different plate for fixedly receiving and stationarily holding an electrical lead to the corresponding plate, the electrical connection between the movable plate and its fixed terminal being completed through relatively slidable contact elements.

7. A variable capacitor structure having a stator comprising an electrically non-conductive member with an aperture therethrough, a contact ring mounted on the non-conductive member concentrically with the aperture, a capacitor dielectric with spaced conductive coatings on one surface, the dielectric being positioned with the coatings against one side of the non-conductive member and with the opposite surface exposed, and terminals mounted on the non-conductive member and separately connected with the conductive coatings on the dielectric and with the contact ring, a rotor assembly comprising a shaft rotatably mounted in the aperture of the non-conducting member and a conductive rotor plate adapted for conformation with and movement in contact with the other side of the capacitor dielectric, and resilient conductive means insulatingly held on the rotor shaft, the resilient conductive means having one pair of resilient contact arms in slidable engagement with the stator contact ring and another pair of resilient fingers engaging the rotor plate to press the rotor plate against the exposed side of the stator dielectric and to mechanically connect the rotor plate for rotation with the rotor shaft.

8. The combination defined by claim 7 wherein the conductive rotor plate comprises a rigid backing plate, a flexible contact plate conductively connected with the backing plate, and a resilient pad retained between the plates for pressing the flexible plate into contact with the capacitor dielectric.

9. The rotor defined by claim 8 wherein the pad is impregnated with an inert water-repellent insulating liquid for lubricating the contacting surface of the capacitor element dielectric and the flexible plate.

10. The combination as defined by claim 7 in which the non-conductive stator member carries fixed contact elements separately connected electrically to two fixed terminals, a third fixed terminal is connected to the contact ring, the capacitor dielectric is positioned with its coatings facing the respective contact elements, and the resilient fingers hold the rotor assembly against the dielectric and hold the dielectric against the contact elements to complete the circuits from the respective conductive coatings to their terminals.

GEORGE T. KODAMA.

REFERENCES CITED

The following references are of record in the file of this patent:

UNITED STATES PATENTS

| Number | Name | Date |
|---|---|---|
| 1,506,781 | Shrader | Sept. 2, 1924 |
| 1,620,020 | Hardy | Mar. 8, 1927 |
| 1,641,438 | Jones | Sept. 6, 1927 |
| 2,036,084 | Roder | Mar. 31, 1936 |
| 2,091,616 | Stoekle | Aug. 31, 1937 |
| 2,101,832 | Barton | Dec. 14, 1937 |
| 2,205,866 | Schweitzer | June 25, 1940 |
| 2,212,231 | Gossel | Aug. 20, 1940 |
| 2,326,341 | Ehlers | Aug. 10, 1943 |
| 2,361,657 | Schock | Oct. 31, 1944 |
| 2,370,722 | Ehlers | Mar. 6, 1945 |
| 2,449,308 | Minnium | Sept. 14, 1948 |

FOREIGN PATENTS

| Number | Country | Date |
|---|---|---|
| 27,257 | France (2nd addition to 549,053) | Jan. 29, 1924 |
| 462,639 | Great Britain | Mar. 12, 1937 |